Figure 1:
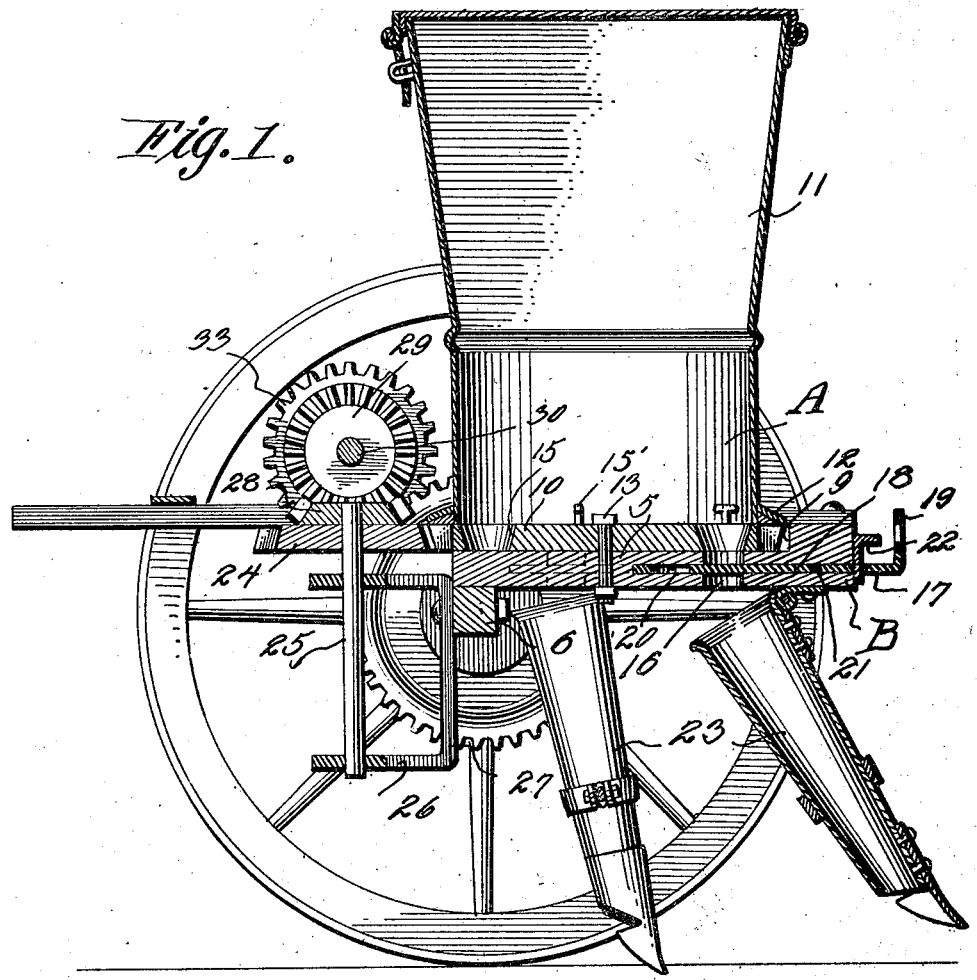

June 17, 1924. 1,498,459
J. LANG
SEED DISPENSING MECHANISM
Original Filed April 8, 1922   2 Sheets-Sheet 1

WITNESSES

Inventor
JOSEPH LANG

By Richard B. Owen   Attorney

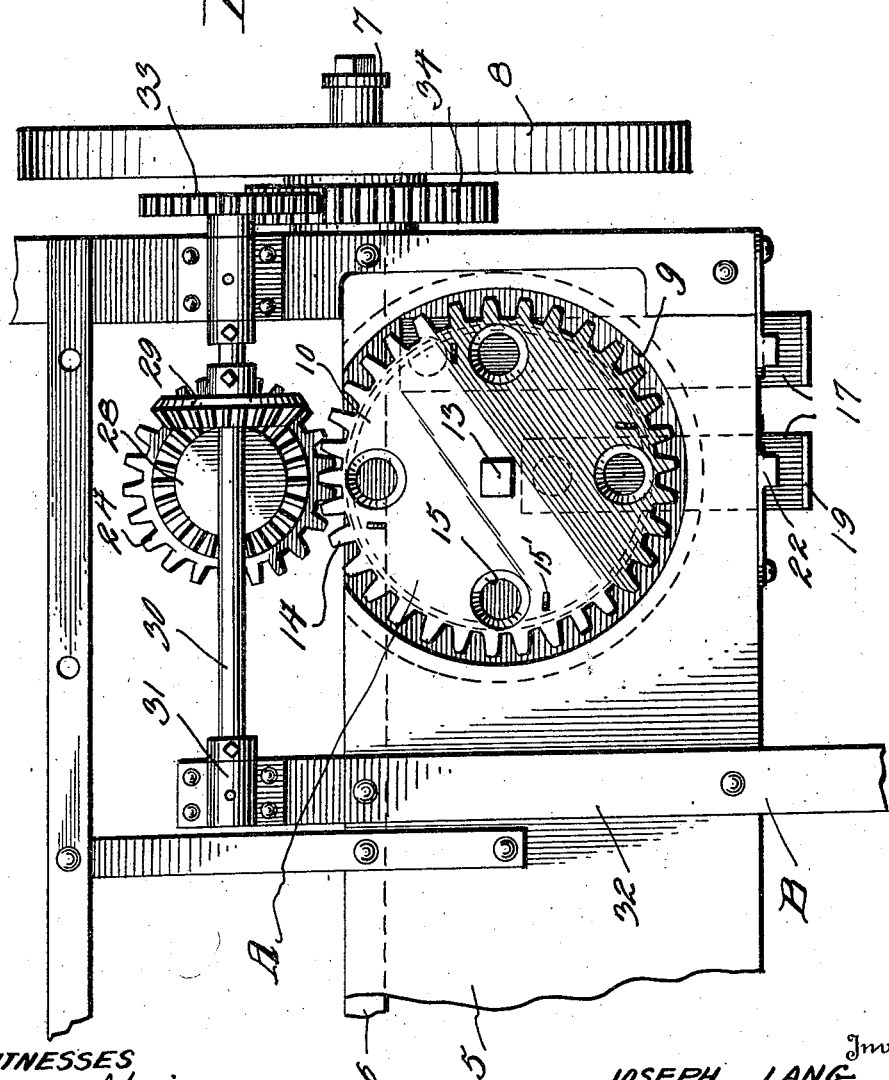

Patented June 17, 1924.

1,498,459

UNITED STATES PATENT OFFICE.

JOSEPH LANG, OF ROSEBUSH, MICHIGAN, ASSIGNOR OF ONE-HALF TO MARY LANG, OF CLEVELAND, OHIO.

SEED-DISPENSING MECHANISM.

Original application filed April 8, 1922, Serial No. 550,594. Divided and this application filed May 14, 1923. Serial No. 638,933.

*To all whom it may concern:*

Be it known that I, JOSEPH LANG, a citizen of the United States, residing at Rosebush, in the county of Isabella and State of Michigan, have invented certain new and useful Improvements in a Seed-Dispensing Mechanism, of which the following is a specification.

This invention relates to new and useful improvements in planters and is a division from my application entitled "Sugar beet drill" filed April 8, 1922, Serial Number 550,594, and the primary object of the present invention is to provide an improved means for permitting a plurality of seeds to drop at spaced points from a seed dispensing mechanism embodying a single hopper, and novel means for controlling the flow of the seeds from the hopper.

Another prime object of the invention is to provide an arrangement whereby one or more rows may be planted out of the same seed hopper at the same time, the arrangement being of an exceptionally simple and durable construction.

A still further object of the invention is the provision of a plurality of independent operable seed discharge regulators for each seed dropping mechanism employing a plurality of seed discharge outlets whereby any one or more of the outlets can be opened or closed without interfering with the discharge process of the others.

A still further object of the invention is to provide an improved hopper discharge or seed dispensing mechanism of the above character, which will be efficient in use, one which will be simple and easy to manufacture and one which can be placed upon the market at a reasonable cost.

With these and other objects in view the invention consists in the novel construction, arrangement and formation of parts, as will be hereinafter more specifically described, claimed and illustrated in the accompanying drawings, forming a part of this specification, in which drawings—

Figure 1 is a vertical transverse section through the improved seed dispensing mechanism, and Figure 2 is a top plan view of one end of a planter incorporated with the improved seed dispensing mechanism, the seed hopper being removed.

Referring to the drawings in detail, wherein similar reference characters designate corresponding parts throughout the several views the letter A generally indicates the improved seed dispensing mechanism incorporated with a planter B, which is preferably of the type as shown in my prior application heretofore referred to. The planter B includes a main frame 5 which in the present instance, consists of an elongated platform whereby the operator may conveniently walk around while controlling the various seed dropping mechanisms A. As shown there is only one seed dropping mechanism, but in practice, it is to be understood that one or more can be mounted upon the platform. An axle 6 is fastened to the underside of the platform with its ends extending beyond the terminals thereof, and are reduced to form skeins 7 upon which are mounted the ground engaging wheels 8.

The platform 5 is provided with a circular recess 9 as clearly shown in Figures 1 and 2 of the drawings and this recess is so disposed as to remove a portion of the platform at the rear edge thereof, so that the drive means for the seed feeding plate 10 which is revolubly mounted in the recess can operate upon the feeding plate to impart thereto the desired movement. Covering the recess 9 and rising above the platform is a seed hopper 11, preferably assuming the form as illustrated in Figure 1 and having its lower edge provided with an outstanding flange 12 to be bolted or otherwise secured to the platform surrounding the recess 9 for the feed plate 10. In the present instance, I have illustrated a hinged closure for the seed hopper, and this closure can form a seat for the operator when the platform is in use.

As heretofore stated, the seed feeding plate is revolubly mounted in the recess 9 and a vertically disposed bolt or axle 13 extends through the platform and forms a centering pin or axle for the feed plate. The periphery of the feed plate 10 is provided with gear teeth 14 for cooperating with means hereinafter more fully described. By referring to Figure 2 of the drawings, it can be seen that the teeth 14 of the feed plate 10 project beyond the rear edge of the platform by reason of the arrangement of the recess 9 formed in the platform. The top face of the feed plate 10 is equipped with upstanding projections which provide agitators for preventing the seed from clogging in the hopper. The feed plate 10 is provided with a plurality of discharge openings 15, arranged circumferentially thereof and in the present instance, the openings are spaced apart to insure a uniform distance between the seeds deposited in the rows. The portion of the platform forming the bottom of the recess 9, is equipped with a pair of openings 16 which extend entirely through the platform and which are adapted for registry with the outlet openings 15 in the feed plate. These openings 16 are of course spaced the same distance from the center pin 13 as the openings 15 in the feed plate 10 are from their respective pins, and it is to be understood that as many of these openings 16 as are desired may be provided for cooperation with the feed plate. However, it is to be particularly noted that these two openings are spaced apart transversely of the planter, and obviously by increasing the number of seed dropping mechanisms or the number of openings associated with each seed dropping mechanism after the increasing of the diameter of the feed plate 10, that the number of rows planted by the machine can be increased in accordance with the desires of the farmer.

In order to control the discharge of seeds through the openings 15, an independent and separate valve means is provided to cooperate with each opening 16 and each valve means consists of a reciprocating slide plate 17 mounted in a suitably shaped way 18 which intersects the respective opening 16. Preferably the outer ends of the slides 17 project beyond the forward longitudinal edge of the platform 5 and are turned upwardly as at 19 to form convenient grips or handles. The inner end of each slide plate 17 which operates within the platform 5 is equipped with an opening 20 adapted for registry and non-registry with its respective opening 16. The opposite end of each slide is provided with a pair of spaced apertures 21 for cooperation with a pivoted latch 22 one being provided for each slide, whereby the slide plate can be locked with its opening 20 in or out of registry with its respective opening 16. The latches 22 are pivoted to the forward edge of the platform 5 and as the two slide plates 17 of the seed discharge mechanism are arranged in close proximity to one another the seed dropping mechanism can be conveniently controlled. A seed drill tube or shoe 23 is provided for each opening 16 of the platform, and is secured to the platform in any preferred way.

The means for revolving the feeding or discharge plate 10 includes a pinion 24 which is keyed to a vertical stub shaft 25, which is journalled in the right angularly disposed ends 26 of a bracket 27 secured to the axle 6 of the planter directly in back of the center pin or axle 13 of the feeding plate 10. A beveled gear 28 is secured to the top face of the pinion 24 and this beveled gear meshes with a similar beveled gear 29 keyed or otherwise secured to a drive shaft 30, which can be mounted in suitable bearings 31, one of which can be carried by a cross bar 32. One end of the shaft 30 is extended laterally of the platform 5 and has keyed or otherwise secured thereto a gear wheel 33, which meshes with a relatively large gear wheel 34, which is secured in any preferred manner to one of the ground wheels 8.

In operation of the improved seed dispensing mechanism, when it is desired to permit the seed to be dispensed through both of the openings 16, both of the slide plates 17 are pulled outwardly and the latches 22 are placed in the innermost recesses 21. When it is desired to permit seed to be dropped through only one of the openings 16, one of the valves is pushed inwardly until the opening 16 is closed and the latch for this valve is then placed in the outermost opening.

It is obvious that when the planter is pulled over the field, that the plate 10 will be rotated through the medium of the pinions 24, 28, 29, shaft 30, and gear wheels 33 and 34 by said ground wheel 8.

Changes in details may be made without departing from the spirit or the scope of this invention.

What I claim as new is:—

1. In a planter, a platform having a recess in its upper face merging into one edge of the platform to remove a portion of said edge, a toothed seed feeding plate revolubly mounted in said recess having its teeth projecting beyond said edge of the platform, a gear carried by the planter and adapted to mesh with the projecting teeth of the seed feeding plate, means for operating the gear, and a hopper carried by the platform and disposed over said seed feeding plate and recess.

2. In a planter, a platform having a recess in its upper face, an apertured seed feeding plate rotatably mounted in the recess, the lower wall of the recess having transverse openings therein communicating with the recess, means for operating the seed feeding plate, the platform having ways therein bisecting the openings communicating with the recess, and independent slide valves mounted in said recesses.

In testimony whereof I affix my signature in presence of two witnesses.

JOSEPH LANG.

Witnesses:
V. M. KENNEDY,
FRANK COURTER.